United States Patent [19]
Heiles

[11] Patent Number: 6,100,737
[45] Date of Patent: Aug. 8, 2000

[54] SCANNER CIRCUIT FOR DIGITAL SIGNALS WITH HIGH DATA RATE

[75] Inventor: Juergen Heiles, Munich, Germany

[73] Assignee: Siemens Aktiengesellschaft, Munich, Germany

[21] Appl. No.: 09/152,887

[22] Filed: Sep. 14, 1998

[30] Foreign Application Priority Data

Sep. 12, 1997 [DE] Germany .............. 197 40 255

[51] Int. Cl.$^7$ ...................................... H03K 5/13
[52] U.S. Cl. ................................. 327/165; 327/141
[58] Field of Search ........................... 327/141, 154, 327/165, 166, 172, 176; 375/355

[56] References Cited

U.S. PATENT DOCUMENTS

| | | | |
|---|---|---|---|
| 4,700,084 | 10/1987 | Honaker, Jr. ........................... | 327/165 |
| 4,947,407 | 8/1990 | Silvian ...................................... | 375/94 |
| 5,349,610 | 9/1994 | Sakamoto et al. ........................ | 375/106 |
| 5,652,773 | 7/1997 | Lu ............................................ | 375/371 |

FOREIGN PATENT DOCUMENTS

| | | |
|---|---|---|
| 0 334 193 | 9/1989 | European Pat. Off. . |
| 0 716 523 | 6/1996 | European Pat. Off. . |
| 0 741 473 | 11/1996 | European Pat. Off. . |

*Primary Examiner*—Tuan T. Lam
*Attorney, Agent, or Firm*—Hill & Simpson

[57] ABSTRACT

A scanner circuit for digital signals with high data rate includes an arrangement for timing pulse recovery formed by a scanner stage for scanning a digital signal and an edge discriminator that evaluates at least one edge of the scanned digital signal and that controls a digital oscillator that generates a data timing signal.

5 Claims, 3 Drawing Sheets

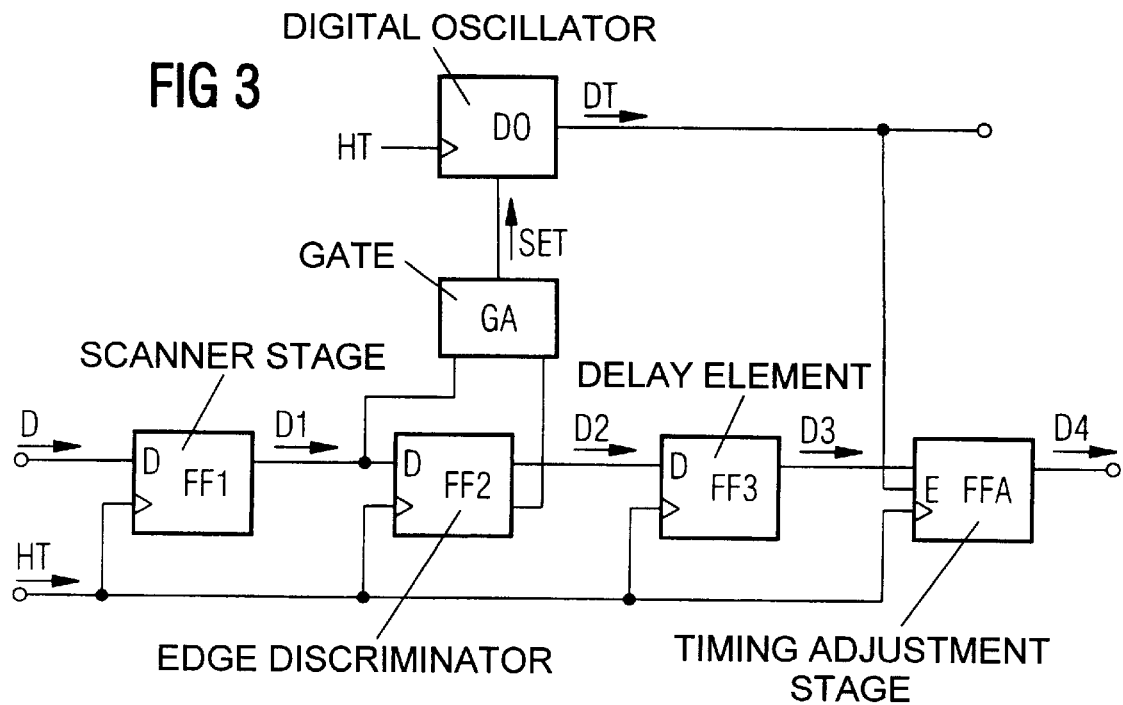
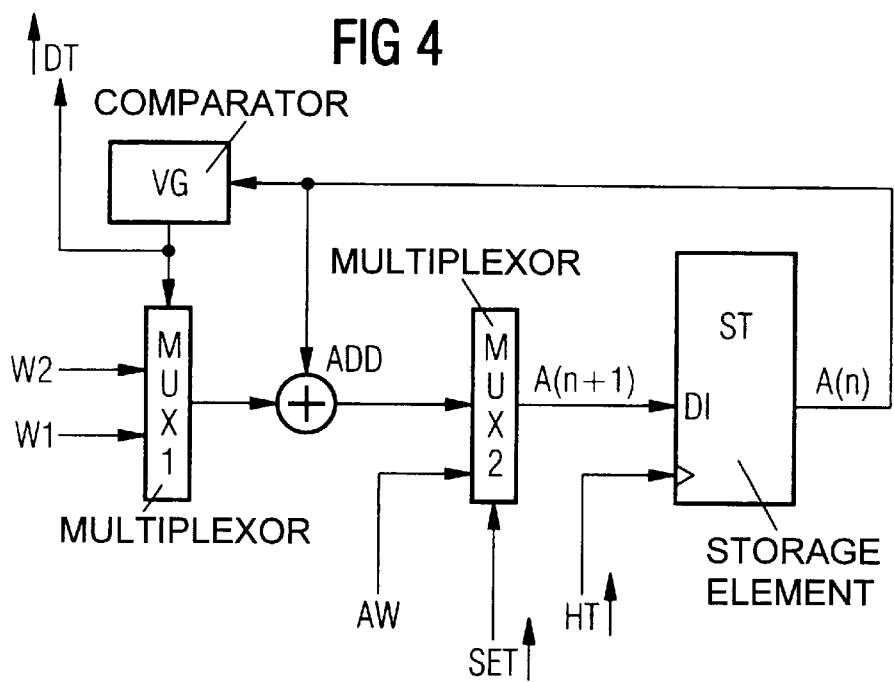

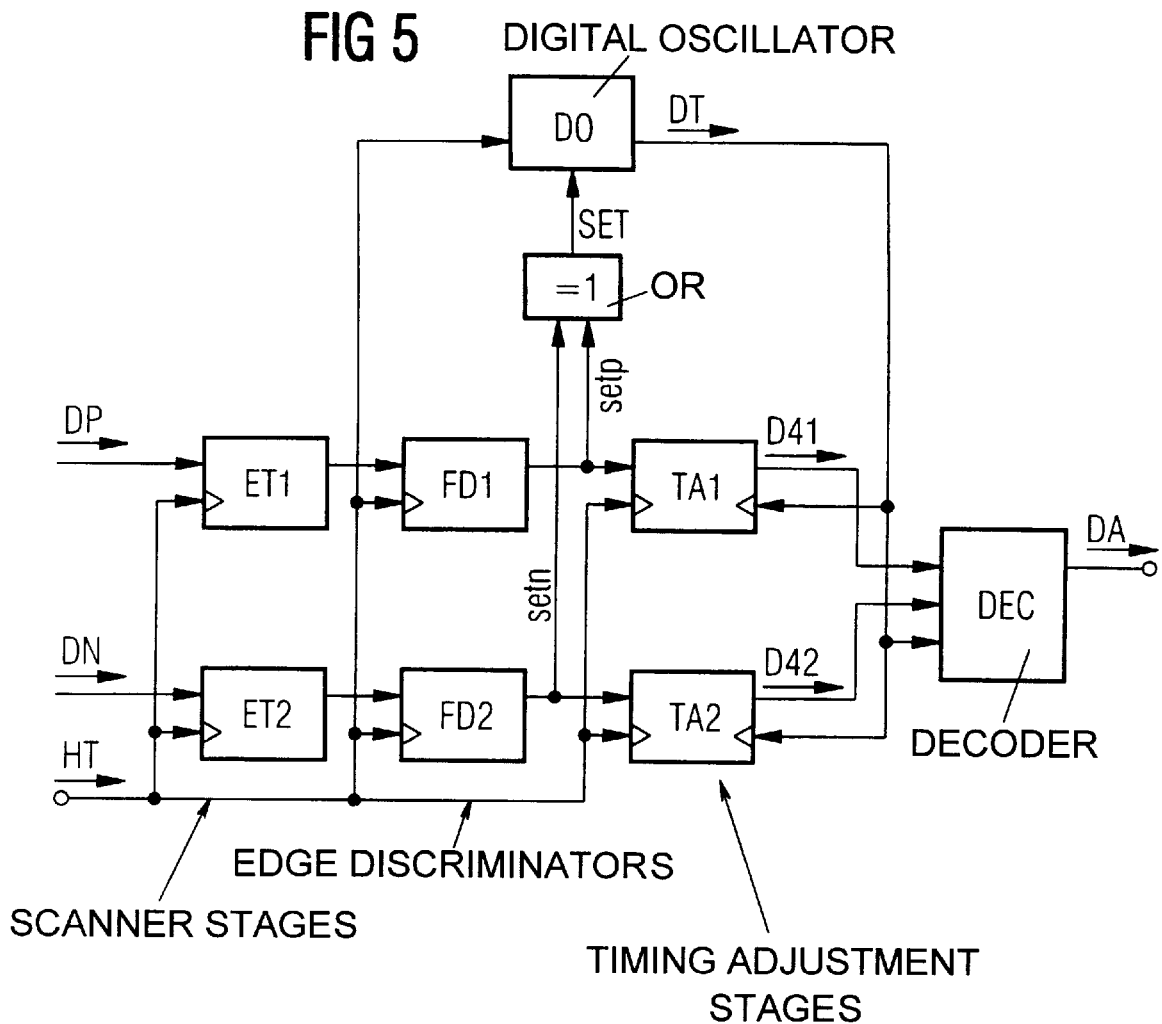

SCANNER CIRCUIT FOR DIGITAL SIGNALS WITH HIGH DATA RATE

BACKGROUND OF THE INVENTION

1. Field of the Invention

The present invention relates to a scanner circuit for digital signals with high data rate.

2. Description of the Prior Art

Transmitted digitized signals should be scanned upon reception thereof as optimally as possible in order to avoid errors even given signal distortions. German OS 44 43 416 discloses a phase detector that compares the received data signal to a scanning signal and obtains a control criterion therefrom for an oscillator that generates a scanning signal derived from the received data.

In an arrangement for continuous matching of the phase of a binary data signal to a timing pulse, as described in the published patent application German OS 38 09 606, auxiliary timing pulses of the same frequency and the same phase separations are generated. From these auxiliary timing pulses, that one is selected which scans the received data signal in the most optimal fashion.

SUMMARY OF TIE INVENTION

An object of the invention to provide a scanner circuit that requires only a single auxiliary timing pulse and that can be realized in purely digital fashion.

The above object is achieved in accordance with the principles of the present invention in a scanner circuit having a scanner stage to which a digital input signal is supplied, the scanner stage emitting a digital scanner stage output signal which is scanned with an auxiliary signal. An edge discriminator is connected to the output of the scanner stage, and generates a control pulse for each positive and/or negative edge of the digital scanner stage output signal. The control pulse is supplied to a digital oscillator, which is also supplied with the auxiliary signal, and the oscillator generates a data timing signal. The data timing signal is supplied to a timing adjustment stage, which is connected to the output of the edge discriminator, which acts on the output signal of the edge discriminator so as to produce the output signal of the overall scanning circuit.

A particular advantage of this scanner circuit is its simple realizability. Since it functions in purely digital fashion, compensation is not necessary. The circuit is particularly simple if designed for restart synchronization wherein the oscillator is triggered by the edges of the digital signal. A correct scanning thereby ensues already following the first evaluated edge of the digital signal.

The circuit can also be utilized for ternary signals wherein positive and negative pulses are fed to separate scanner circuits.

DESCRIPTION OF THE DRAWINGS

FIG. 3 is a circuit diagram for the invention scanner circuit.

FIG. 4 is a circuit diagram digital oscillator of the inventive scanner circuit.

FIG. 5 shows a scanner circuit for a ternary digital signal in accordance with the invention.

DESCRIPTION OF THE PREFERRED EMBODIMENTS

Figure 1:
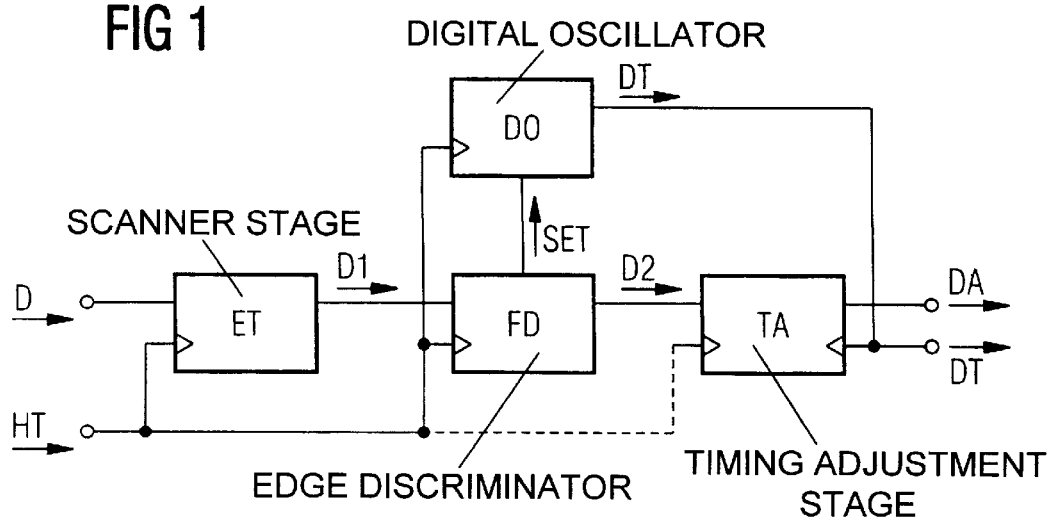
FIG. 1 is a schematic block diagram of an embodiment of a scanner circuit in accordance with the invention.

The scanner circuit depicted in FIG. 1 contains a serial circuit including a scanner stage ET, an edge discriminator FD and a timing adjustment stage TA. A digital oscillator DO controlled by the edge discriminator FD is additionally provided. An auxiliary timing signal HT is fed to the functional units; at least one data timing signal DT generated by the digital oscillator DO is additionally fed to the timing adjustment stage TA.

Figure 2:
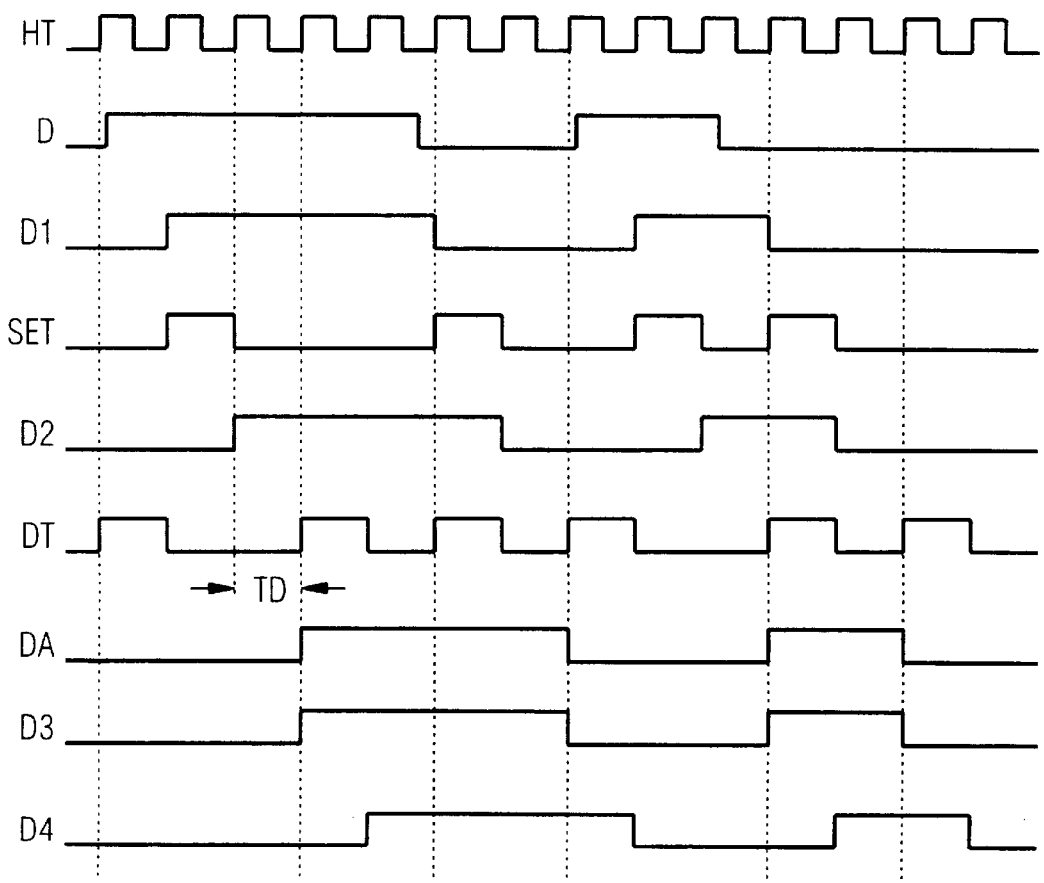
FIG. 2 is a pulse diagram for explaining the operation of the inventive scanner circuit.

The function of the scanner circuit is further detailed using the pulse diagram depicted in FIG. 2. The binary digital signal D at the input of the scanner stage ET is scanned with the positive edge of the auxiliary timing signal HT and is at the input of the edge discriminator FD as the scanned digital signal D1. This edge discriminator FD delays the digital signal by one auxiliary timing pulse period and generates a control pulse SET either for each edge or for only one edge e.g. the positive edge, of the digital signal. The duration of this pulse set corresponds to that of a timing pulse period of the auxiliary timing signal. At the end of the control pulse SET, with the subsequent positive edge of the auxiliary timing signal HT, the digital oscillator DO is set at a defined value in order to generate an effective positive edge of the data timing signal DT following a predetermined time-span TD. With this pulse edge and with the subsequent positive pulse edges, the individual data bits of the delayed digital signal D2 are scanned approximately in the middle, so that they emit a correctly scanned output signal DA.

FIG. 3 depicts a simple exemplary circuit design of the scanning circuit.

The scanner stage ET is realized in its simplest variation as a D flip-flop FF1.

The edge discriminator is formed by a flip-flop FF2 having a data input and an output to which the inputs of a gate GA are respectively connected. If a SET pulse is to be generated with only one edge thereof being used to trigger the oscillator DO, then a gate GA that realizes an AND function or an OR function can be utilized AS THE GATE ga. If both edges of the data signal trigger the oscillator DO, then a gate with an exclusive-OR function is utilized as the gate GA.

A third D flip-flop FF3 serving only as a delay element is connected to the edge discriminator FD downstream as part of the timing adjustment stage TA. The data timing signal DT is thereby utilized as an enable signal for the scanner flip-flop FFA, which scans the additionally delayed digital signal D3 with the auxiliary timing signal and emits the output signal D4 (in FIG. 2, which corresponds to the output signal DA of the circuit according to FIG. 1).

The entire scanner circuit thus can be designed in synchronous technology. In this wholly synchronous design, only a single timing signal is utilized—the auxiliary timing signal HT. According to circuit design and depending on the frequency ratio of the auxiliary timing signal to the digital signal, or respectively, to the corresponding data timing signal, the timing adjustment stage TA can also contain a number of delay elements connected to the edge discriminator FD downstream in order to correctly scan the multiply delayed digital signal in the scanner flip-flop FFA.

The data signal DT serves for the further processing of the output data.

FIG. 4 depicts the digital oscillator DO in detail. It contains a storage element ST having a data input D1 to which a serial circuit formed by a first multiplexer MUX1, an adder ADD and a second multiplexer MUX2 is connected upstream. The output of the storage element ST is connected to a second input of the adder ADD and to a comparator VG.

The digital oscillator DO utilizes the principle of a sigma-delta modulation. This permits the generation of the nominal timing pulse frequency of the data timing signal even if the frequency of the auxiliary timing signal is not an integral multiple of the frequency of the data timing pulse.

The basic principle of operation is as follows. Given the occurrence of an edge of the digital signal D, a control pulse is generated which effects a transfer of an initial value AW into the storage element ST via the second multiplexer MUX2. With the next pulse of the auxiliary timing signal HT a first input value W1 is added in the adder ADD to the output value A(n) of the storage element ST, and the value A(n+1) is stored. With each subsequent pulse of the auxiliary timing signal the first input value W1 is added again until a threshold is crossed and the data signal reaches a logic one value. This is monitored by the comparator VG. After the crossing of this threshold, the subtraction of a second input value W2 occurs, whereby the threshold is no longer exceeded, and so on.

According to the time diagram illustrated in FIG. 2 the threshold is already crossed following the storage of the initial value AW and the addition of an input value W1; it is no longer exceeded by virtue of the addition of the second negative input value; it is exceeded again due to addition of the first input value, etc. The minimal period of the data timing signal T encompasses two periods of the auxiliary timing signal.

Dependent on the requirements and the ratio of the auxiliary timing period to a data bit period, the first input value and the initial value can be dimensioned such that one or more first input values must be added to the initial value before the threshold is exceeded, and a delay time TD equaling a number of timing periods of the auxiliary signal is thus generated.

If the received data signal does not encompass a logic state change, and so a control pulse SET is not generated, the addition of the positive and negative input values is continued and the data timing signal is thus generated. The input values are always dimensioned such that the data timing signal corresponds on average to the frequency of the digital signal. The individual timing periods are variable, however, since they can only arise in the raster or pattern of the auxiliary timing signal.

The digital oscillator can be adapted to requirements with ease. First, an integral ratio W1/W corresponding to the frequency of the data timing signal to the frequency of the auxiliary timing signal $f_D/f_{HT}$ is defined. W is used as a threshold value. The numerator is defined as the first input value W1, and the difference W1−W is defined as second input value W2.

If the generation of an optimally symmetrical data timing signal which is several auxiliary timing periods long is intended, then two threshold values are required. It is also possible to generate the first effective timing pulse edge of the data timing signal already with the storage of the initial value this edge would then be suitable for scanning the data signal D1 or, given a different ratio of the frequencies, to generate the first pulse of the data timing signal only after a number of auxiliary timing periods.

Instead of the restart synchronization, the storage contents can also be corrected by the control pulse SET.

The digital oscillator DO can also be realized by means of a switchable counter controlled by the contents of the storage element.

FIG. 5 depicts a basic circuit diagram of a scanner circuit for ternary signals. The received ternary data signal—e.g. an HDB3 coded signal—is initially converted in known fashion into two binary data currents DP and DN which are respectively fed to one of two of the scanner circuits ET1, FD1, TA1 and ET2, FD2, TA2 as described above. The digital oscillator DO is controlled by the two scanner circuits by means of set pulses setp, setn via an OR-element OR. The scanned data signals D41, D42 are fed to an HDB3 decoder DEC, which converts them into a binary output data signal DA.

Although modifications and changes may be suggested by those skilled in the art, it is the intention of the inventor to embody within the patent warranted hereon all changes and modifications as reasonably and properly come within the scope of his contribution to the art.

I claim as my invention:

1. A scanner circuit for digital signals with a high data rate, comprising:
   a scanner stage having a first input supplied with a digital data signal and a second input supplied with an auxiliary timing signal, said scanner stage scanning said digital data signal dependent on said auxiliary timing signal and emitting a digital scanned signal at an output of the scanner stage;
   an edge discriminator having a first input connected to the output of the scanner stage and being supplied at said first input with said digital scanned signal, and having a second input supplied with said auxiliary timing signal, said edge discriminator generating a control pulse directly upon each occurrence of at least one of each positive edge and each negative edge of said digital scanned signal;
   a digital oscillator having a first input supplied with said control pulse from said edge discriminator, and having a second supplied input with said auxiliary timing signal, said digital oscillator generating a data timing signal dependent on said control signal and said auxiliary timing signal; and
   a timing adjustment stage having a first input connected to an output of said edge discriminator, and having a second input supplied with said data timing signal from said digital oscillator, said timing adjustment stage scanning a signal at the output of said edge discriminator, dependent on said data timing signal, and generating a final output signal.

2. A scanner circuit for digital signals with a high data rate, comprising:
   a scanner stage having a first input supplied with a digital data signal and a second input supplied with an auxiliary timing signal, said scanner stage scanning said digital data signal dependent on said auxiliary timing signal and emitting a digital scanned signal at an output of the scanner stage;
   an edge discriminator having a first input connected to the output of the scanner stage and being supplied at said first input with said digital scanned signal, and having a second input supplied with said auxiliary timing signal, said edge discriminator generating a control pulse upon an occurrence of at least one of each positive edge and each negative edge of said digital scanned signal;
   a digital oscillator having a first input supplied with said control pulse from said edge discriminator, and having a second supplied input with said auxiliary timing signal, said digital oscillator generating a data timing signal dependent on said control signal and said auxiliary timing signal, said digital oscillator being set to an initial value by said control pulse and thereafter emitting a first edge of the data timing signal following a predetermined time after said control pulse and, given an absence of further changes in said control pulse, generating a remainder of said data timing signal at a nominal frequency of said digital data signal; and a timing adjustment stage having a first input connected to an output of said edge discriminator, and having a second input supplied with said data timing signal from said digital oscillator, said timing adjustment stage scanning a signal at the output of said edge discriminator, dependent on said data timing signal, and generating a final output signal.

3. A scanner circuit as claimed in claim 2 wherein said digital oscillator comprises a serial circuit comprising a first multiplexer having an output connected to a first input of an adder, a second multiplexer connected to an output of said adder, a storage element having an input connected to an output of said second multiplexer and an output connected to a second input of said adder, and said digital oscillator further comprising a comparator connected to the output of said storage element which compares an output from said storage element to a threshold value for producing an output signal which controls said first multiplexer, said first multiplexer having different input values which are switched through by said first multiplexer to said first input of said adder dependent on said output of said comparator, and said second multiplexer having said initial value at an input thereof and transferring said initial value to said storage element upon receipt of said control pulse from said edge discriminator.

4. A scanner circuit, for digital signals with a high data rate, comprising:

a scanner stage having a first input supplied with a digital data signal and a second input supplied with an auxiliary timing signal, said scanner stage scanning said digital data signal dependent on said auxiliary timing signal and emitting a digital scanned signal at an output of the scanner stage;

an edge discriminator having a first input connected to the output of the scanner stage and being supplied at said first input with said digital scanned signal, and having a second input supplied with said auxiliary timing signal, said edge discriminator generating a control pulse upon an occurrence of at least one of each positive edge and each negative edge of said digital scanned signal;

a digital oscillator having a first input supplied with said control pulse from said edge discriminator, and having a second supplied input with said auxiliary timing signal, said digital oscillator generating a data timing signal dependent on said control signal and said auxiliary timing signal; and a timing adjustment stage having a first input connected to an output of said edge discriminator, and having a second input supplied with said data timing signal from said digital oscillator, said timing adjustment stage scanning a signal at the output of said edge discriminator, dependent on said data timing signal, and generating a final output signal, and having a third input supplied with said auxiliary timing signal, said auxiliary timing signal serving as a timing signal for said timing adjustment stage and said data timing signal serving as an enable signal for said timing adjustment stage.

5. A scanner circuit for digital signals with a high data rate, comprising:

a scanner stage having a first input supplied with a digital data signal and a second input supplied with an auxiliary timing signal, said scanner stage scanning said digital data signal dependent on said auxiliary timing signal and emitting a digital scanned signal at an output of the scanner stage;

an edge discriminator having a first input connected to the output of the scanner stage and being supplied at said first input with said digital scanned signal, and having a second input supplied with said auxiliary timing signal, said edge discriminator deriving a control pulse from each occurrence of at least one of each positive edge and each negative edge of said digital scanned signal;

a digital oscillator having a first input supplied with said control pulse from said edge discriminator, and having a second supplied input with said auxiliary timing signal, said digital oscillator generating a data timing signal dependent on said control signal and said auxiliary timing signal; and a timing adjustment stage having a first input connected to an output of said edge discriminator, and having a second input supplied with said data timing signal from said digital oscillator, said timing adjustment stage scanning a signal at the output of said edge discriminator, dependent on said data timing signal, and generating a final output signal.

* * * * *